(12) United States Patent
Sengupta et al.

(10) Patent No.: US 8,126,461 B2
(45) Date of Patent: Feb. 28, 2012

(54) SYSTEM, METHOD, AND COMPUTER-READABLE MEDIUM FOR USER EQUIPMENT MANAGING MULTIPLE RADIO NETWORKS FOR HANDOVER AND LOW-POWER OPERATIONS

(75) Inventors: Chaitali Sengupta, Richardson, TX (US); Yuan Kang Lee, San Diego, CA (US)

(73) Assignee: SNRLabs Corporation, Richardson, TX (US)

( * ) Notice: Subject to any disclaimer, the term of this patent is extended or adjusted under 35 U.S.C. 154(b) by 1060 days.

(21) Appl. No.: 11/929,376

(22) Filed: Oct. 30, 2007

(65) Prior Publication Data

US 2008/0102832 A1     May 1, 2008

Related U.S. Application Data

(60) Provisional application No. 60/863,931, filed on Nov. 1, 2006.

(51) Int. Cl.
*H04Q 7/20* (2006.01)
(52) U.S. Cl. .................. 455/435.2; 455/435.1; 455/574; 370/351
(58) Field of Classification Search ........... 455/435.1–2, 455/436, 438–439, 574; 370/351–356
See application file for complete search history.

(56) References Cited

U.S. PATENT DOCUMENTS

| | | | |
|---|---|---|---|
| 7,009,952 B1 | 3/2006 | Razavilar et al. | |
| 2004/0087307 A1 | 5/2004 | Ibe et al. | |
| 2004/0264414 A1 | 12/2004 | Dorenbosch | |
| 2005/0159153 A1 | 7/2005 | Mousseau et al. | |
| 2005/0249161 A1 | 11/2005 | Carlton | |
| 2006/0025151 A1 | 2/2006 | Karaoguz et al. | |
| 2006/0268848 A1* | 11/2006 | Larsson et al. | 370/356 |
| 2007/0032239 A1 | 2/2007 | Shaheen et al. | |
| 2007/0115899 A1 | 5/2007 | Ovadia et al. | |
| 2007/0173283 A1 | 7/2007 | Livet et al. | |
| 2007/0197227 A1* | 8/2007 | Naqvi et al. | 455/445 |
| 2008/0080480 A1* | 4/2008 | Buckley et al. | 370/352 |
| 2008/0089289 A1* | 4/2008 | Jayaram et al. | 370/331 |

(Continued)

FOREIGN PATENT DOCUMENTS

WO      WO 02/19736 A2      3/2002

(Continued)

OTHER PUBLICATIONS

PCT International Preliminary Examining Authority—European Patent Office, PCT Notification of Transmittal of the International Preliminary Report on Patentability mailed Feb. 6, 2009, International Application No. PCT/US2007/083158, filed Oct. 31, 2007, 14 pages, NL-2280 HV Rijswijk.

(Continued)

*Primary Examiner* — Cong Tran
(74) *Attorney, Agent, or Firm* — Jones Day

(57) ABSTRACT

A system, method, and computer-readable medium for a communications system to manage multiple radios and protocol stacks in a network and in a user equipment are provided. When active communications takes place over one radio system, an alternate radio system is managed in such a way that promotes both low-power operations and quick handovers. When communications are idle over all of the networks, one radio network may be assigned to be a primary radio network, and the alternate radio network may be switched off provided all incoming calls are routed to the primary radio network.

10 Claims, 2 Drawing Sheets

U.S. PATENT DOCUMENTS

2010/0061337 A1* 3/2010 Hallenstal et al. ............ 370/331

FOREIGN PATENT DOCUMENTS

| WO | WO 2004/100452 A2 | 11/2004 |
| WO | WO 2006/078627 A2 | 7/2006 |
| WO | WO 2007/026267 A2 | 3/2007 |

OTHER PUBLICATIONS

3GPP SA WG2, 3rd Generation Partnership Project; Technical Specification Group Services and Architecture; Feasibility Study on Multimedia Session Continuity; Stage 2; (Release 8), 3GPP TR 23.893, 3GPP Technical Recommendation, Oct. 23, 2007, pp. 1033, XP002474433, URL:http://www.3gpp.org/ftp/Specs/archive/23_series/23.893/23893-030.zip.

PCT International Searching Authority—European Patent Office, PCT Notification of Transmittal of the International Search Report and the Written Opinion of the International Searching Authority, or the Declaration, International Application No. PCT/US2007/083158, filed Oct. 31, 2007, Apr. 14, 2008, 11 pages, NL-2280 HV Rijswijk.

PCT International Preliminary Examining Authority—European Patent Office, PCT Notification of Transmittal of the International Preliminary Report on Patentability mailed Jun. 2, 2009, International Application No. PCT/US2009/031291, filed Jan. 16, 2009, 13 pages, NL-2280 HV Rijswijk.

* cited by examiner

SYSTEM, METHOD, AND COMPUTER-READABLE MEDIUM FOR USER EQUIPMENT MANAGING MULTIPLE RADIO NETWORKS FOR HANDOVER AND LOW-POWER OPERATIONS

CROSS REFERENCE

This patent application claims the benefit of provisional U.S. patent application Ser. No. 60/863,931, filed Nov. 1, 2006, which is hereby incorporated by reference. The following applications also claim priority to the above referenced provisional application and are related to the present application. They are incorporated by reference herein.

Copending U.S. patent application Ser. No. 11/929,066, filed on Oct. 30, 2007 and entitled "System, Method, and Computer-Readable Medium for Selecting a Network for Connectivity and Handover Based on Application Requirements"

Copending U.S. patent application Ser. No. 11/929,231, filed on Oct. 30, 2007 and entitled "System, Method, and Computer-Readable Medium for User Equipment Decision-Making Criteria for Connectivity and Handover"

BACKGROUND

IP multimedia subsystem (IMS) is a standardized architecture for provisioning of mobile and fixed multimedia systems. IMS provides for the transformation of the core wireless network architecture for efficient and cost-effective delivery of advanced multimedia services. Though driven by the $3^{rd}$ Generation Partnership Project (3GPP), IMS is designed to be access agnostic—i.e., it enables access to advanced services via GSM, W-CDMA, CDMA2000, WiFi and other wireless broadband technologies like WiMAX, as well as fixed broadband systems. IMS aims to create a converged Internet Protocol (IP) infrastructure that allows key network resources to be shared by a wide range of services. IMS uses a voice-over-Internet Protocol (VoIP) scheme based on the standardized implementation of the session initiation protocol (SIP). The IMS standards define a network domain dedicated to the control and integration of multimedia services.

Without IMS, operators are forced to allocate dedicated components to each and every service that is deployed. Such service implementations are not scalable and are highly inefficient in a world in which users are demanding more personalized services and greater flexibility as regards to, for example, mixing and matching offerings. IMS also makes it possible for users to access multiple services in the course of the same call or session. Moreover, IMS enables operators to establish and control quality of service imperatives for individual services while at the same time protecting the overall integrity of network performance. IMS will significantly improve end-user experience by enabling flexible, personalized and seamless communications across access standards.

A multi-mode, multi-radio user equipment is capable of obtaining services through multiple radio networks, for example, via a wireless wide area network (WWAN) such as GSM/UMTS and via a wireless local area network (WLAN) such as 802.11 a/b/g. Of primary concern in the operations of such a multi-mode, multi-radio user equipment in low-power operations. With multiple radios in the user equipment, high power consumption will occur unless the operation of the radios and the protocol stacks are managed with low power operations in mind.

One of the main utilities of a multi-mode, multi-radio user equipment is its ability to obtain services from the network that best fits its needs. For example, if the coverage of GSM/UMTS is poor in an office building, but the coverage of WLAN is good, the user equipment may choose WLAN to make a voice call. As the user equipment moves from inside the office building to the outside, the coverage situation reverses, and unless the voice call may be transferred from the WLAN network to the GSM/UMTS network, the call may be disadvantageously discontinued.

BRIEF DESCRIPTION OF THE DRAWINGS

Aspects of the present disclosure are best understood from the following detailed description when read with the accompanying figures, in which.

DETAILED DESCRIPTION

Figure 1:
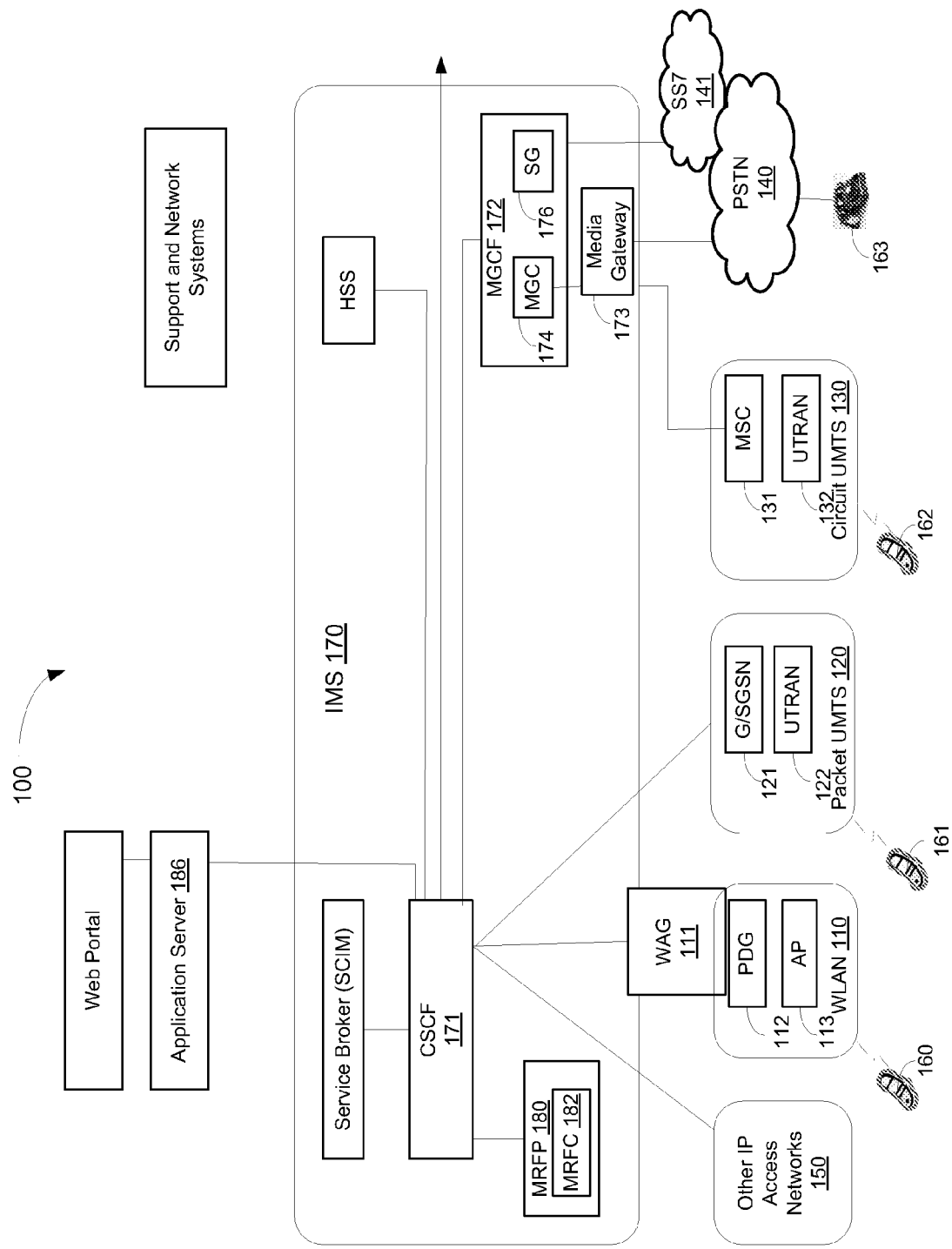
FIG. 1 is a diagrammatic representation of an embodiment of a network system in which IMS may be deployed in accordance with an embodiment.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an embodiment of a network system 100 in which IMS may be deployed. FIG. 1 is intended as an example, and not as an architectural limitation, of embodiments described herein. IMS infrastructure may be deployed in stages and may include infrastructure developed and manufactured by a variety of vendors that may be deployed by any number of service carriers or operators. System 100 may include any variety of access networks. In the illustrative example, system 100 includes a wireless local area network (WLAN) 110, e.g., a network implemented in compliance with the IEEE 802.11 standards, a packet switched universal mobile telecommunications system (UMTS) 120, a circuit switched UMTS 130, a public switched telephone network (PSTN) 140 and corresponding signaling system 141, such as a signaling system #7 network, and other IP access networks 150. PSTN 140 provides circuit switched telecommunication services to one or more circuit switched end points 163. WLAN 110 may interface with IMS 170 via WLAN access gateway (WAG)111. WLAN 110 may include a packet data gateway (PDG) 112, one or more access points 113 that may provide wireless access to user equipments (UEs) 160-162, and various other equipment as is understood. Packet UMTS 120 may include one or more gateway general packet radio service (GPRS) support nodes (GGSNs) and serving GPRS support nodes (SGSNs) (collectively referred to herein as G/SGSN 121. Packet switched UMTS 120 may include a UMTS radio access network (UTRAN) 122 that may provide radio access to UEs 160-162 and various other equipment as is understood. WAG 111 comprises a gateway between WLAN 110 and 3GPP/IMS network 100. A Packet Data Gateway (PDG) 112 provides access to PS-based services for a WLAN UE. Circuit UMTS 130 may include a mobile services switching center (MSC) 131, a UTRAN 132, and various other equipment as is understood.

Various terminals may connect with one or more of the access networks. As referred to herein, a user equipment (UE) comprises a terminal or station that may connect with one or more access networks for establishing a session with an entity of system 100 or another user equipment or terminal connected with one or more of the access networks of system 100 or another telecommunication system. In the depicted example, UE 160 is connected with WLAN 110, UE 161 is connected with packet UMTS 120, and UE 162 is connected with circuit UMTS 130. Additionally, an analog endpoint 163, such as an analog telephone, is connected with PSTN 140. Some UEs may be adapted to connect, in some instances concurrently, with multiple access networks. A UE adapted to connect with multiple access networks is referred to herein as a multi-mode UE or device.

IMS 170 may include various functions, nodes, or other entities, and those depicted in FIG. 1 are illustrated to facilitate an understanding of embodiments disclosed herein. Call Session Control Function (CSCF) 171 may act as Proxy CSCF (P-CSCF), Serving CSCF (S-CSCF) or Interrogating CSCF (I-CSCF).

SIP may be used as the protocol for communications between a UE with CSCF 171. A Media Gateway Control Function (MGCF) 172 controls the parts of the call state that pertain to connection control for media channels in an IMS-media gateway (MGW), e.g., MGW 173. MGCF 172 may communicate with CSCF 171, a breakout gateway control function (BGCF), e.g., a SIP server that includes routing functionality based on telephone numbers, and PSTN 140 entities. Additionally, MGCF 172 may determine the next hop depending on the routing number for incoming calls from legacy networks. MGCF 172 may include or interface with a media gateway controller (MGC) 174 and a signaling gateway 176.

IMS-MGW 173 may terminate bearer channels from a circuit switched network, e.g., PSTN 140, and media streams, e.g., RTP streams in an IP network, from a packet network, e.g., packet UMTS 120. IMS-MGW 173 may support media conversion, bearer control and payload processing, e.g. codec, echo canceller, conference bridging, and the like. IMS-MGW 173 may interact with MGCF 172 for resource control, own and handle resources such as echo cancellers, etc, and may be equipped with codecs.

A Multimedia Resource Function Controller (MRFC) 182 may control media stream resources in a Multimedia Resource Function Processor (MRFP) 180, interpret information coming from an application server (AS) 186 and S-CSCF, e.g., a session identifier, and control MRFP 180 accordingly.

MRFP 180 may control IP bearers, provide resources to be controlled by MRFC 182, mix incoming media streams, e.g., for multiple parties, sources media streams (for multimedia announcements), and process media streams, e.g., audio transcoding, media analysis, and the like, and perform floor control, i.e., manage access rights to shared resources in a conferencing environment.

Application Server 186, e.g., a SIP Application Server, OSA Application Server, CAMEL IM-SSF application server, or other application server, may offer value added services to system 100 and reside either in the user's home network or in a third party location. The third party could be a network or simply a stand-alone AS. Application Server 186 may influence and impact a SIP session on behalf of the services supported by the operator's network. An AS may host and execute services.

IMS functioning is access network agnostic. However, the connectivity of each access network to the IMS infrastructure is specific to the access network.

Voice Call Continuity (VCC) from circuit UMTS 130 to IMS 170 (VoIP over IMS) is being specified in 3GPP. Two logical functions, a Call Continuity Control Function (CCCF) and Network Domain Selection (NeDS), are added to the architecture to support VCC.

The Call Continuity Control Function provides for reception and processing of call continuity requests caused by radio related events, e.g., availability or loss of radio coverage, and establishment and release of call legs needed to transfer a voice call from the CS domain to the IMS domain, or vice versa.

Network Domain Selection (NeDS) comprises the control point for selecting which domain to use for terminating a call. Normally it may be expected that a CS terminating call will terminate on the CS side of a multi-mode terminal, and an IMS terminating call will terminate on the IMS side of a multi-mode terminal, although there are situations where the selection of the other domain is appropriate, e.g., in the case of a CS terminating call when the terminal is not CS-attached but is IMS registered. In addition to technical considerations, user preferences and service availability considerations may be considered and may be implemented in the NeDS function. The UE may be registered to both domains and may choose to originate a voice call (or session) via either CS or IMS domain, depending on operator offered choices.

Exemplary applications and services that may be supported by IMS 170 include web browsing, video sharing, video telephony and conferencing, push to talk over cellular, presence services, instant messaging, multiplayer games, and concurrent IMS services and CS voice services.

For the specific case of multimode convergence based on IMS, there are certain user scenarios that require management of the multiple access systems supported by the handset. Some of these scenarios include:

- Support of multiple connections via multiple access standards e.g., video sharing via cellular and background email download via WLAN or WiMax;
- Handling a second incoming call via another access standard;
- Handover and mobility of data sessions and VoIP calls; and
- Emergency call via best access standard.

As IMS infrastructure and service deployment progresses, handset vendors continue to face the same challenges that have been driving them over the past several years, e.g., the capability to offer new services and features in the handset without increasing cost of the handset, handset development cost, and time to market the handset.

Converged or convergence terminals, i.e., UEs compatible with IMS 170, have in many ways already taken root. However, while converged terminals have opened doors to the promise of multiple utility terminals, many existing devices are still somewhat service specific. The best examples currently are the camera phone and RIM BlackBerry™. Despite these current concerns and shortcomings, converged devices provide the promise of reaching the goal of one device that holds functionality for all forms of communications, computing, music, video, games, and personal efficiency.

To be suitably adapted to interface with various access networks, a converged terminal may be adapted to multiple modems. To accommodate multi-radio terminals for interfacing with multi-access networks, a converged terminal essentially needs multi-access awareness. A multi-radio device needs to be able to access different services through different access methods. Being able to access email via WLAN or GPRS from a smart phone, playing a game over Bluetooth with a friend in the same room and then inviting a far-away friend to join the game via 3G are examples of what activities are possible via IMS 170.

Management of handset resources is critical for a desirable user-experience in IMS 170. Because of the variety of applications that may be run via IMS 170, energy consumption can be expected to increase as additional applications and more processor-intensive services are deployed. However, improvements in battery capacity simply haven't kept pace with ever-more-powerful processors and other power consumers in the handset. Accordingly, efficient management of power consumption mechanisms are provided by embodiments disclosed herein.

With the addition of new features and services, handset development costs and time to market continue to be important factors in UE design. Modular designs that feature various sub-systems that may be obtained from a variety of vendors may advantageously reduce handset development costs.

Figure 2:
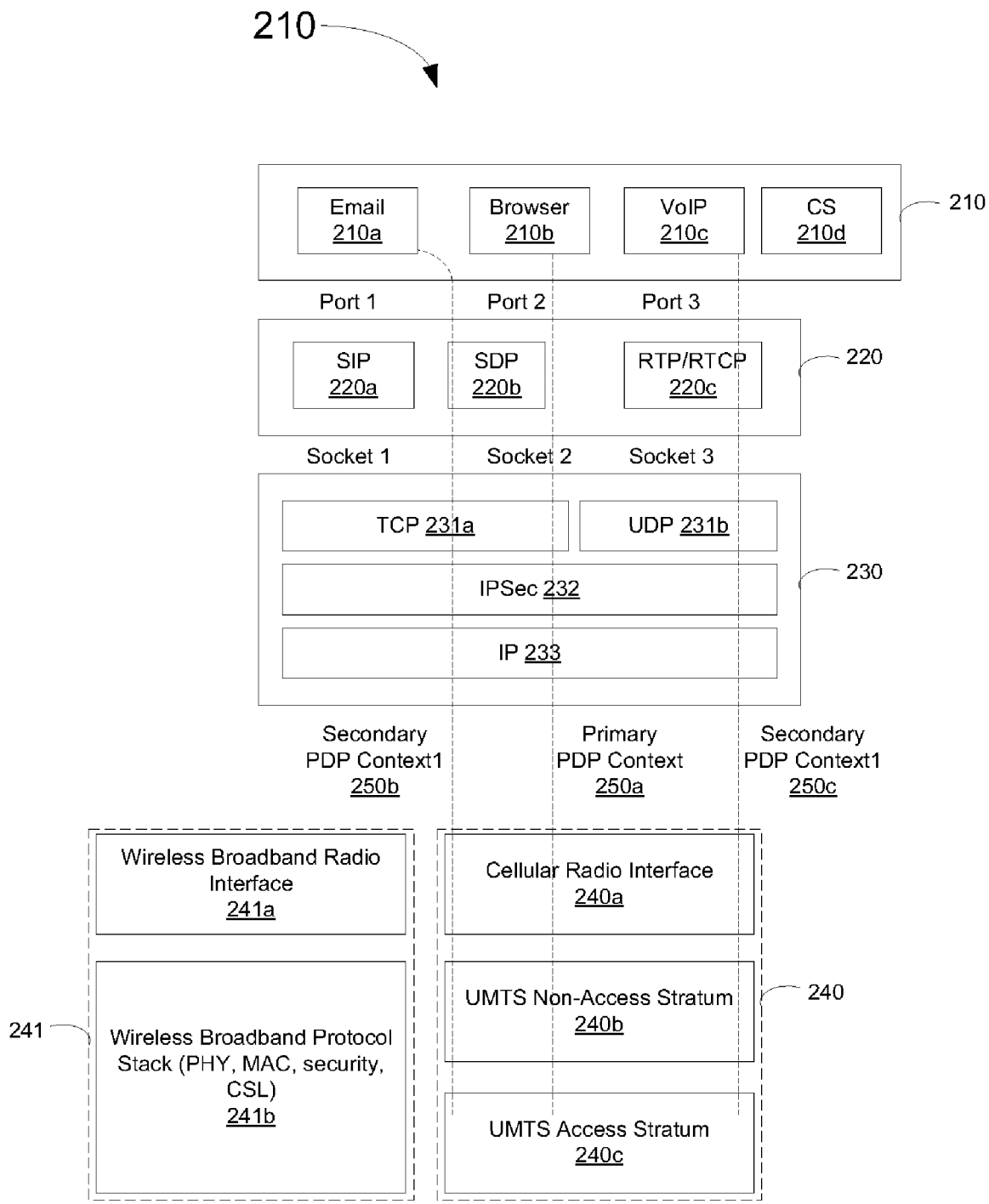
FIG. 2 depicts a diagrammatic representation of an embodiment of a multi-mode terminal.

With reference now to FIG. 2, an exemplary software configuration 200 of a converged terminal is depicted. Various applications 210 may be deployed in configuration 200. In the illustrative example, applications 210 include an Email application 210a, a browser application 210b, a VoIP application 210c, and a circuit-switched application 210d. Applications 210 are bound to application layer 220, e.g., via traditional sockets and ports as shown in FIG. 2. In the illustrative example, application layer 220 includes SIP 220a, SDP 220b, and RTC/RTCP 220c.

SIP 220a is an application layer protocol. Session Initiation Protocol (SIP) was developed and designed within the Internet Engineering Task Force (IETF). SIP is a request-response signaling protocol for setting up and starting voice, video, and instant messaging communication sessions over the Internet.

SIP's essential communication function is aided by extensions and further protocols and standards. Two protocols commonly used are the Session Description Protocol (SDP) 220b and Real-time Transport protocol 220c (RTP).

RTP 220c is used to carry session payload data, such as real-time multimedia data such as audio, video, and text. RTP 220c encodes and splits the data into packets and transports such packets over the Internet. RTP 220c is frequently used in streaming media systems as well as videoconferencing and push to talk systems making it the technical foundation of the Voice over IP industry. RTP may be used in conjunction with the RTP Control Protocol (RTCP) and it is built on top of the User Datagram Protocol (UDP).

SDP 220b describes and encodes capabilities of session participants. Such a description is then used to negotiate the characteristics of the session so that all devices can participate. Hence, SIP, SDP, and RTP/RTCP are necessary to implement an application such as a "SIP-based VoIP" protocol.

Application layer 210 may interface with lower layers of network stack 230. In the illustrative example, network stack 230 includes a transmission control protocol (TCP) 231a and a user datagram protocol (UDP) 231b transport layers, an IP security (IPSec) 232 layer, and an IP 233 network layer, although other transport and network layers may be suitably substituted for those depicted.

Convergent terminals require the support of multiple protocol stacks 240 and 241 and multiple radios as shown in FIG. 2. The first impact is on the hardware that requires integration of the modem basebands onto the same system. In typical designs, the basebands of the various modems are implemented on different chips. Additionally, a converged device may feature the co-existence and simultaneous activity of multiple radios. The multiple modems need to be able to communicate with upper layers (typically IP) via identifiers such as the UMTS PDP contexts 250a-250c (illustratively designated with dashed lines) shown in FIG. 2. Each primary PDP context 250a is associated with a unique PDP address (which includes the IP address) and each secondary PDP context 250b-250c is associated with a primary context and helps support multiple QoS streams required by different applications supported in lower layers via different radio access bearers. Major cellular standards as well as emerging wireless broadband standards, such as WiMax, support well defined QoS classes. In the illustrative example, configuration 200 includes a first protocol stack 240 adapted to accommodate UMTS access and includes a cellular radio interface 240a, a UMTS non-access stratum 240b, and a UMTS access stratum 240c. A second protocol stack 241 adapted to accommodate wireless radio broadband access network may include a wireless broadband radio interface 241a and a wireless broadband protocol stack 241b, e.g., a wireless broadband physical (PHY) layer, media access control (MAC) layer, security and CSL layers, or the like.

Additionally, a converged device may feature a High level OS (HLOS), such as Symbian, Linux, and Microsoft Windows Mobile. HLOS vendors or associated groups, such as Mobilinux Open Framework, are offering more integrated features in their software packages such as IPv6, 2.5G and 3G radio interface layers and connectivity management software.

As discussed above, a mobile device, such as a mobile terminal having the software configuration 200 depicted in FIG. 2, may be capable of simultaneous communications to two or more radio access technologies. Advantageously, different applications may use a different radio access network, for example, a voice call on cellular and e-mail downloading on WLAN. Moreover, simultaneous communications allows a handover technique referred to as make-before-break that provides for a seamless transition from one access network to another, which is both simple and effective to implement, and the simultaneous communications allows deep core network agents to set up and execute the handover.

In accordance with embodiments, inter-system monitoring and connection state management is provided for situations where only one radio technology is actively used by the mobile station (the primary radio technology), and the other radio technology is not active (the secondary radio technology). Embodiments disclosed herein facilitate management of the secondary radio technology to optimize power, handover latency, and quality of service. As referred to herein, an access network that is actively used by a user equipment is referred to as a primary access network, and an access network with which the user equipment is not actively using for communication or data services is referred to as a secondary access network.

To facilitate an understanding of the disclosed embodiments, the following four general primary and secondary access network configurations are discussed, although implementations of embodiments disclosed herein are not limited to such a configuration:
1) Primary: WiFi VoIP+data; Secondary: cellular CS call+ cellular data
2) Primary: WiFi data; secondary: cellular data
3) Primary: Cellular CS+data call; Secondary: WiFi VoIP+ data
4) Primary: Cellular data; secondary: WiFi data Assume a UE is active on a primary radio access network and a secondary radio access network has been found by the UE. For instance, a network may be identified as primary based on an operator/subscriber profile, UE power conditions, or other criteria as discussed above. Further assume the primary radio access network is WLAN where the UE is engaged in both active VoIP and data sessions and the secondary radio access network is cellular. The purpose of the secondary radio access network is to be ready when an application using the primary radio access network needs or is desired to be handed over to the secondary radio access network. For example, due to network coverage conditions, it may be desirable to handover the VoIP session to cellular CS on the secondary radio access network. Using the secondary radio access network, the UE may register with both the secondary radio access network and with the home IMS network in order to inform the home IMS network of its presence and capabilities. Because the secondary radio access network is to be used when the primary access network is no longer appropriate, no services are requested on the secondary radio access network but only the service capabilities are registered in accordance with an embodiment. Further, the UE informs the IMS network that no network originated service shall be activated on the secondary radio access network. The reason, again, is that the secondary radio access network is only to be used when the UE specifies to the network that a handover is required.

It is important for the UE to register with the IMS network of its presence and capabilities via the secondary RAT. In this way, when the handover is to be executed, network connectivity between the UE and the IMS network has already been established. Further, the UE has already been authorized on the IMS network via the secondary radio access network. By registering with the IMS and secondary radio access network, handover latency may be advantageously reduced when the UE subsequently determines to execute the handover. At the time when the handover procedure is invoked, the home network has all information necessary to activate and transfer the desired services on the secondary radio access network. Additionally, a new service can be quickly established on the secondary radio access network, if so desired by the user, and with low start up latency.

In accordance with embodiments, it is important that the UE only register and not receive any network-originated services or data from the secondary radio access network prior to the handover. In this manner, the UE's power consumption is advantageously reduced because the UE may be configured to not monitor the paging indicator channel, or its equivalent, of the secondary radio access network. Advantageously, the UE may only need to do whatever is necessary to maintain the secondary radio access network, such as monitoring of serving cell and neighboring cell conditions, perform re-selection when necessary, and re-register with the secondary radio access network or with the IMS network when necessary. In accordance with embodiments, the UE may be optimized to only infrequently perform these functions, and hence save power.

To further minimize the UE's activities on the secondary RAT, the internal discontinuous reception (DRX) cycle of the UE may be set to the largest cycle within its capability. Setting the DRX cycle to the largest available setting provides benefits in power consumption. Additional optimization may be realized by configuring the UE to not monitor the pilot channel (PICH), which not only saves power directly, but indirectly saves power by eliminating false detections of the PICH. Other additional optimizations may include reducing the frequency that neighbor cells are monitored.

While the UE is registered but idle in the secondary radio access network, a PDP context may be set up for any real time service that may require low latency handover. This may, for example, be a video sharing application for the case of packet switching. For the case of a circuit switched connection, no special context is needed. Hence, for a data only scenario, the secondary radio access network may be set up with PDP context active for real-time data services and at the same time the UE is not actively in service via the secondary radio access network. For the example of GPRS/EDGE, such a UE would be in packet IDLE state; for W-CDMA, this UE would be in CELL_PCH or URA_PCH state. Thus, when desired by the UE, packet activity may be set up quickly on the secondary radio access network. No additional state needs to be added if circuit-switched services are desired but rather are set up at the time of the handover. When the only real-time service required is circuit-switched, the secondary radio access network shall be set up to be in CS attached state.

When the primary radio access network is WLAN, it is important that the UE can find and register on the secondary radio access network that can offer the services desired by the UE. If no secondary radio access network is found, and the primary is WLAN, the UE can quickly lose service once it traverses outside the WLAN coverage area. When searching for the secondary network, such as a cellular or WWAN network, the UE can rely on the typical nominal search, scan, and monitor methods for cellular or WWAN networks. In the alternate case where the primary radio access network is WWAN, the search for the secondary radio access network may be performed with less frequency. This is because the WWAN coverage area is broad, and the chance of losing the WWAN relatively small.

At UE power on, an "always on" state of the UE is desired in accordance with embodiments disclosed herein. "Always on" provides to a user a perception that a network service can be launched immediately with very low latency. The user does not have to manually connect to the network, such as dialing an ISP. For an application that accesses network services, it means that the network connection is available at phone start-up, and the application can access the network with very low latency.

As an example of "always on," consider the following two example applications: web browsing and presence service using IMS.

At phone power on, both the WLAN and cellular radios of the UE attempt to camp on (register) with their respective access networks. For the cellular radio, after camping on, a generic PDP context will be activated at a default QoS (e.g., 384 Kbps) that's adequate for web browsing. The TCP/IP connection will be mapped to this PDP context and mapped to that of the web browser. Hence, when the browser starts and requests data, the cellular radio is ready and data transfer can begin immediately. From the viewpoint of the user, it appeared that the Internet is "always connected", even though the application was not launched at phone power on.

In this first example, web browsing may also take place over WLAN. At phone power on, the WLAN system attempts to attach to the access point. Once the MAC address is acquired and IP addresses resolved, TCP/IP and HTTP can start immediately.

Various considerations may be evaluated to determine which radio access technology should be used to establish this TCP/IP connection for the browser, that is which radio access network is selected as the primary access network. For example, the QoS of the required connection, the chance of losing coverage, cost, and other consideration may be accounted for in determining which access network is selected as the primary access network. For the browser, assume that 384 Kbps is desired and such a data rate cannot be reached on the cellular system due to either radio conditions or that 2.5G is the only system found. Hence, WLAN is chosen as the primary access network, and communication is ready to begin on the WLAN.

For the presence application using IMS, the presence application needs to register with the home IMS agent to indicate that it is alive, so a connection is needed immediately. Particularly, the presence service needs to register with the IMS home location register (HLR). One the presence application runs, presence status of the user's group is displayed, and the phone appears to be always connected. A WLAN may be assigned preference because it may have the fastest connection time. An IP address is thus assigned to the UE so that it may register with the HLR via WLAN.

Thus, at start up, the following scenario may exist:

The WLAN is selected as the primary RAT. Once the internet connection is authorized, and the presence application communicates to the HLR, the WLAN connection can be put in an idle mode.

Over the cellular system, the UE is PS attached and ready for service handover.

Additionally, should the right user, network, and environmental criteria be met, the cellular system may be selected by the UE to become the primary RAT.

When all applications are off or idle, the UE may request the network that all network initiated communications (one example, an incoming call; another is incoming e-mail) to come via only the primary RAT. The main reason is to conserve power usage. When all network initiated communications can be negotiated to come from one RAT, the secondary RAT may be monitored at a less frequent rate. In addition, the UE may completely shut down the secondary RAT, especially when the primary RAT is WWAN, and the chance of losing coverage is small. In such an instance, the power savings may be significant since only one radio is turned on.

In accordance with other embodiments, inter-system monitoring strategies for cellular and wireless broadband systems may accommodate out of service, idle/always-on, and one or both active scenarios and may perform UE wake up only to perform cell selection but no paging check. Control DRX may be based on conditions, scan rates and methods may be optimized for power consumption. Polling connections may be scheduled for multiple applications, e.g., presence, for finding the best connection in the next time period (e.g., time period "X"). Multiple simultaneous connections may be accommodated. In one implementation, a second connection may be maintained as Active or Always on (attached/registered) with attachment to two access networks maintained, when possible, for quick application start. Additionally, immediate and "timed" inter system handovers may be provided where "timed" handovers may be based on a future packet numbers instead of a frame number.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. For example, descriptions of a UE convergence manager have been provided in the context of a UE deployed in a network system featuring IMS. However, such a network system is not necessary, but rather advantages may be had by implementation of embodiments disclosed herein in any multi-mode network system that features multiple access network technologies with or without IMS. Accordingly, all such changes, substitutions and alterations are intended to be included within the scope of the present disclosure as defined in the following claims.

What is claimed is:

1. A method of provisioning communication services in a network system, comprising:
    managing a state of each of a plurality of radio access networks;
    maintaining an indication of available services of each of the plurality of radio access networks;
    engaging a primary access network of the plurality of radio access networks in an active state with a user equipment, wherein an application servicing the user equipment is active on the primary access network;
    registering the user equipment with a secondary access network of the plurality of access networks in a non-active state, the registering comprising:
        attaching the user equipment with the secondary access network;
        activating a packet data protocol context with the secondary access network;
        registering the user equipment with an Internet Protocol Multimedia Subsystem on the secondary radio access network; and
        informing the Internet Protocol Multimedia Subsystem that no services are requested on the secondary radio access network,
    wherein the network system is adapted to perform handover from the primary access network to the secondary access network based on registration of the user equipment with the secondary access network.

2. A method of provisioning communication services in a network system, comprising:
    managing a state of each of a plurality of radio access networks;
    maintaining an indication of available services of each of the plurality of radio access networks;
    engaging a primary access network of the plurality of radio access networks in an active state with a user equipment;
    registering the user equipment with a secondary access network of the plurality of access networks in a non-active state, wherein the network system is adapted to perform handover from the primary access network to the secondary access network based on registration of the user equipment with the secondary access network, wherein the primary radio access network comprises a wireless wide area network, and wherein the user equipment is idle on the wireless wide area network, the method further comprising:
    powering off secondary radio access network equipment of the user equipment; and
    evaluating connectivity and service of the secondary radio access network in the event an application servicing the user equipment is activated.

3. The method of claim 2, wherein the user equipment elects to power off secondary radio access network equipment in order to save battery power of the user equipment.

4. A method of provisioning communication services in a network system, comprising:

managing a state of each of a plurality of radio access networks;

maintaining an indication of available services of each of the plurality of radio access networks;

engaging a primary access network of the plurality of radio access networks in an active state with a user equipment;

registering the user equipment with a secondary access network of the plurality of access networks in a non-active state, wherein the network system is adapted to perform handover from the primary access network to the secondary access network based on registration of the user equipment with the secondary access network, wherein the primary radio access network comprises a wireless local area network, and wherein the user equipment is idle on the wireless local area network, the method further comprising:

attaching the user equipment with the secondary radio access network; and activating a packet data protocol with the secondary radio access network.

5. The method of claim 4, further comprising:

registering the user equipment with an Internet Protocol Multimedia Subsystem on the secondary radio access network; and informing the Internet Protocol Multimedia Subsystem that no services are requested on the secondary radio access network.

6. A computer-readable medium having computer-executable instructions for execution by a processing system, the computer-executable instructions for provisioning communication services in a network system, comprising:

instructions for managing a state of each of a plurality of radio access networks;

instructions for maintaining an indication of available services of each of the plurality of radio access networks;

instructions for engaging a primary access network of the plurality of radio access networks in an active state with a user equipment, wherein an application servicing the user equipment is active on the primary access network;

instructions for registering the user equipment with a secondary access network of the plurality of access networks in a non-active state, the instructions for registering the user equipment comprising:

instructions for attaching the user equipment with the secondary access network;

instructions for activating a packet data protocol context with the secondary access network, instructions for registering the user equipment with an Internet Protocol Multimedia Subsystem on the secondary radio access network; and instructions for informing the Internet Protocol Multimedia Subsystem that no services are requested on the secondary radio access network, wherein the network system is adapted to perform handover from the primary access network to the secondary access network based on registration of the user equipment with the secondary access network.

7. A computer-readable medium having computer-executable instructions for execution by a processing system, the computer-executable instructions for provisioning communication services in a network system, comprising:

instructions for managing a state of each of a plurality of radio access networks;

instructions for maintaining an indication of available services of each of the plurality of radio access networks;

instructions for engaging a primary access network of the plurality of radio access networks in an active state with a user equipment; and instructions for registering the user equipment with a secondary access network of the plurality of access networks in a non-active state, wherein the network system is adapted to perform handover from the primary access network to the secondary access network based on registration of the user equipment with the secondary access network, wherein the primary radio access network comprises a wireless wide area network, and wherein the user equipment is idle on the wireless wide area network, the computer-readable medium further comprising:

instructions for powering off secondary radio access network equipment of the user equipment; and instructions for evaluating connectivity and service of the secondary radio access network in the event an application servicing the user equipment is activated.

8. The computer-readable medium of claim 7, wherein the user equipment powers off secondary radio access network equipment in order to save battery power of the user equipment.

9. A computer-readable medium having computer-executable instructions for execution by a processing system, the computer-executable instructions for provisioning communication services in a network system, comprising:

instructions for managing a state of each of a plurality of radio access networks;

instructions for maintaining an indication of available services of each of the plurality of radio access networks;

instructions for engaging a primary access network of the plurality of radio access networks in an active state with a user equipment;

instructions for registering the user equipment with a secondary access network of the plurality of access networks in a non-active state, wherein the network system is adapted to perform handover from the primary access network to the secondary access network based on registration of the user equipment with the secondary access network, wherein the primary radio access network comprises a wireless local area network, and wherein the user equipment is idle on the wireless local area network, the computer-readable medium further comprising:

instructions for attaching the user equipment with the secondary radio access network; and instructions for activating a packet data protocol with the secondary radio access network.

10. The computer-readable medium of claim 9, further comprising:

instructions for registering the user equipment with an Internet Protocol Multimedia Subsystem on the secondary radio access network; and instructions for informing the Internet Protocol Multimedia Subsystem that no services are requested on the secondary radio access network.

* * * * *